US008744630B2

(12) United States Patent  (10) Patent No.: US 8,744,630 B2
Colby et al. (45) Date of Patent: Jun. 3, 2014

(54) SYSTEM AND METHOD FOR MEASURING ATMOSPHERIC PARAMETERS IN ENCLOSED SPACES

(75) Inventors: Roy Stephen Colby, Raleigh, NC (US); Mark John Kocher, Raleigh, NC (US)

(73) Assignee: Schneider Electric USA, Inc., Palatine, IL (US)

( * ) Notice: Subject to any disclaimer, the term of this patent is extended or adjusted under 35 U.S.C. 154(b) by 436 days.

(21) Appl. No.: 12/981,740

(22) Filed: Dec. 30, 2010

(65) Prior Publication Data

US 2012/0173026 A1 Jul. 5, 2012

(51) Int. Cl.
| | |
|---|---|
| G05B 21/00 | (2006.01) |
| G01M 1/38 | (2006.01) |
| G05B 13/00 | (2006.01) |
| G05B 15/00 | (2006.01) |
| G05D 23/00 | (2006.01) |
| G06F 19/00 | (2011.01) |
| G08B 1/00 | (2006.01) |
| B64F 1/04 | (2006.01) |

(52) U.S. Cl.
USPC ........... 700/276; 700/245; 340/539.2; 244/63

(58) Field of Classification Search
USPC .................. 700/245, 276; 340/539.2; 244/63
See application file for complete search history.

(56) References Cited

U.S. PATENT DOCUMENTS

| | | | |
|---|---|---|---|
| 6,718,277 B2 * | 4/2004 | Sharma ......................... 702/132 |
| 6,813,563 B1 * | 11/2004 | Bradley et al. .................... 702/3 |
| 7,131,136 B2 * | 10/2006 | Monroe ........................ 725/105 |
| 7,567,844 B2 | 7/2009 | Thomas et al. |
| 7,965,174 B2 | 6/2011 | Wong et al. |
| 2003/0060962 A1 * | 3/2003 | Carroll ........................... 701/103 |
| 2004/0128097 A1 * | 7/2004 | LaMarca et al. .............. 702/104 |
| 2004/0167682 A1 * | 8/2004 | Beck et al. ........................ 701/3 |
| 2004/0257227 A1 * | 12/2004 | Berry ............................ 340/540 |
| 2006/0063523 A1 * | 3/2006 | McFarland .................... 455/423 |
| 2006/0071780 A1 * | 4/2006 | McFarland ................ 340/539.2 |
| 2008/0195687 A1 | 8/2008 | Jung et al. |
| 2009/0219145 A1 | 9/2009 | Wong et al. |
| 2009/0254408 A1 | 10/2009 | McMillan |
| 2009/0326709 A1 * | 12/2009 | Hooper et al. ................. 700/245 |
| 2011/0046789 A1 | 2/2011 | Vanheerden et al. |
| 2011/0107248 A1 | 5/2011 | Blum et al. |
| 2011/0168838 A1 * | 7/2011 | Hornback et al. .............. 244/63 |

OTHER PUBLICATIONS

International Search Report for International Application No. PCT/US2011/061326, mailed May 4, 2012, 4 pages.
Written Opinion for International Application No. PCT/US2011/061326, dated May 4, 2012, 8 pages.

* cited by examiner

*Primary Examiner* — Mohammad Ali
*Assistant Examiner* — Ziaul Karim
(74) *Attorney, Agent, or Firm* — Locke Lord LLP

(57) ABSTRACT

A system and method of measuring atmospheric parameters in an enclosed space using instrumented objects having measurement sensors. The instrumented objects travel through the space randomly or along defined flight paths. As the instrumented objects travel through the space, the measurement sensors measure atmospheric parameters and store the measurements to a memory. The devices periodically upload the measured atmospheric parameters to a controller circuit. By using self-propelled objects to carry measurement sensors, the system and method disclosed herein allow for periodically sampling atmospheric parameters in the interior of an enclosed space at a number of locations greater than the number of measurement devices employed. With data points taken from various locations within a volume of an enclosed space, the system and method can realize a more efficient utilization of energy by adjusting mechanical controls of an HVAC system or a ventilation system, for example.

22 Claims, 6 Drawing Sheets

SYSTEM AND METHOD FOR MEASURING ATMOSPHERIC PARAMETERS IN ENCLOSED SPACES

FIELD OF THE INVENTION

The present disclosure relates generally to measurement of atmospheric parameters, and, more particularly, to a system and method for measuring atmospheric parameters in an enclosed space using sensors affixed to airborne self-propelled devices.

BACKGROUND

Building management systems (BMS) are used to regulate heating, ventilation, and air-conditioning (HVAC) systems within some buildings, or within enclosed spaces. Generally, a BMS includes both hardware and software components linked together and configured to monitor and control atmospheric parameters within an enclosed space. A BMS operates by sampling atmospheric parameters, and then sending the measurements to the software for analysis. The software then determines whether to adjust hardware components within the building's ventilation system to create or maintain desirable atmospheric conditions. Hardware components generally include fans, louvers, and dampers for controlling the speed and direction of airflow within a building's ventilation system.

The BMS can regulate environmental parameters such as temperature, humidity, carbon dioxide content, and oxygen content. The BMS can use temperature measurements to determine adjustments to the heating and cooling functions of an HVAC system. Similarly, the BMS can use humidity and carbon dioxide content measurements to determine whether to draw in fresh air and at what rate. The BMS can be configured to operate while optimizing for energy efficiency, for the comfort of occupants, or for parameters desired in a particular setting, such as an operating range of sensitive equipment. For example, the BMS can monitor the level of carbon dioxide, and mix in fresh outside air with waste air to increase the amount of oxygen while also minimizing heating and cooling losses.

The BMS requires real time measurements of atmospheric parameters for the software to determine how to regulate the hardware components of the BMS system. In a large building or enclosure, it is desirable to have multiple measurements to enable the BMS to locally control the atmospheric parameters within the space. Measurements are conventionally limited to measurements taken along interior walls within an enclosed space. For example, wall mounted thermostats conventionally include temperature sensors, but only collect measurements along the interior walls of an enclosed space. Large enclosed spaces such as atriums, multi-level lobbies, auditoriums, warehouses, convention centers, and sports arenas present measurement challenges for a BMS regulating the enclosed space. Large volumes of unmeasured air can exist between interior walls where sampling conventionally occurs. Conventionally, the BMS can not collect measurements of atmospheric parameters from the interior of a large enclosed space.

BRIEF SUMMARY

Provided herein is a system and method for sampling measurements in the interior of a large enclosed space for use by a building management system (BMS). Sensors carried on instrumented objects measure atmospheric parameters. The instrumented objects can optionally be self-propelled objects configured to fly or float through the enclosed space. The instrumented objects move through the enclosed space on randomly selected or predetermined flight paths, collecting measurements of the atmospheric parameters as they travel. The flight paths of the instrumented objects are tracked by position sensors mounted on the instrumented objects. The position sensors generate a set of position measurements indicative of the locations of the instrumented objects. Base stations are positioned along the interior walls of the enclosed space for the instrumented objects to intermittently dock with. During docking, the instrumented objects can refuel or recharge and can send the atmospheric parameter measurements to a controller. Alternatively, the instrumented objects can send the measurements to the controller wirelessly or using a data line. The set of position measurements is also sent to the controller.

The controller analyzes the set of position measurements and the measured atmospheric parameters and determines the location within the enclosed space corresponding to each measured parameter. The measured parameters and corresponding locations are then sent to the BMS. The BMS can use the collected measurements taken in the interior of the enclosed space to make adjustments to mechanical controls of the ventilation system of the space. In a configuration of the present disclosure, the BMS receives atmospheric measurements from a number of locations within the enclosed space that exceeds the number of measurement devices employed. Because the instrumented objects are configured to travel through the enclosed space while carrying measurement devices, relatively few instrumented objects can collect atmospheric measurements from a relatively large number of locations within the enclosed space.

Additionally, the present disclosure provides for collecting atmospheric measurements from the interior of an enclosed space without installing any permanent installations in the interior of the enclosed space. Because the instrumented objects can be configured to fly through the interior of the space, the measurement devices can collect atmospheric measurements from the interior of the enclosed space without being installed in a permanent installation.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

DETAILED DESCRIPTION

Figure 1A:
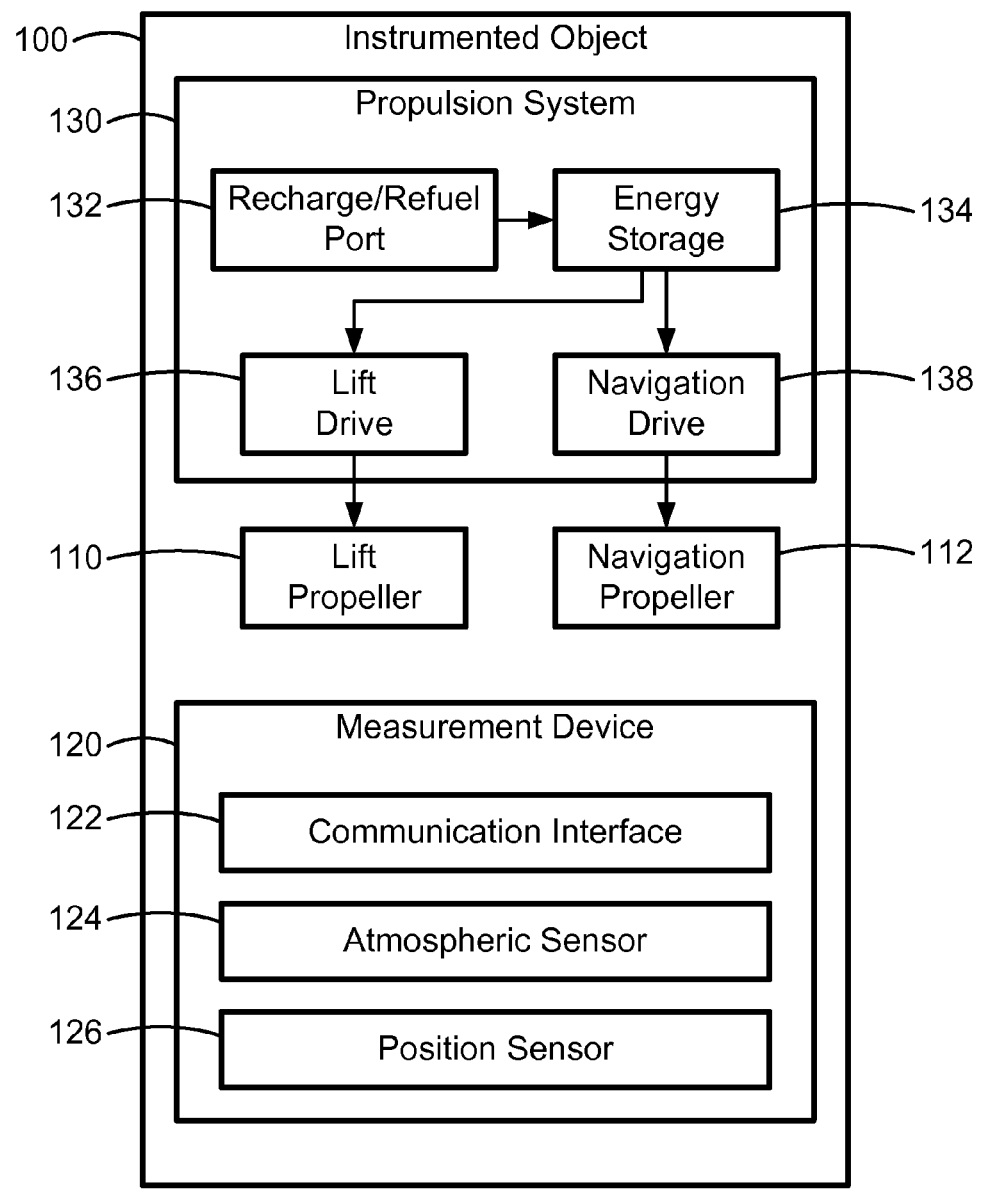
FIG. 1A is a block diagram of an instrumented object.

FIG. 1A is a block diagram of an instrumented object 100 according to one embodiment of the invention. The instrumented object 100 includes a propulsion system 130 and a measurement device 120. The instrumented object 100 uses the propulsion system 130 to move through an enclosed space while carrying the measurement device 120. The measurement device 120 measures an atmospheric parameter within the enclosed space while the instrumented object 100 moves through the enclosed space. The measurement device 120 is equipped with an atmospheric sensor 124 for detecting an atmospheric parameter, a position sensor 126 for detecting the position of the instrumented object 100 within the enclosed space, and a communication interface 122. The atmospheric sensor 124 is a commercially available sensor for detecting an atmospheric parameter within the enclosed space. For example, the atmospheric sensor 124 can detect one or more of temperature, humidity, oxygen concentration, carbon dioxide concentration, carbon monoxide concentration, or airflow rate within the enclosed space. The atmospheric sensor can also detect airflow rate using, for example, a pitot tube, an anemometer, or by measuring the resistance of a heated wire. The atmospheric sensor 124 can also be a smoke detector when it is configured to detect the presence of smoke particulates, or of any other parameters commonly associated with an impending fire as appreciated by those skilled in the art of smoke detection.

The position sensor 126 detects the location of the instrumented object 100 within the enclosed space. The position sensor 126 can be any commercially available sensor for detecting position based on movement or on a measured time delay of reference signals. For example, the position sensor 126 can incorporate accelerometers or gyroscopes to track the movement of the instrumented object 100 relative to an initial known location. The position sensor 126 can also incorporate a receiver receiving signals from known locations such that a measurement of the relative time delays of the signals reveals position information by triangulation. Alternatively, the instrumented object 100 can be implemented without the position sensor 126. The position sensor 126 can be located within the enclosed space and can measure the location of the instrumented object 100 based on relative time delays of signals transmitted from, or reflected from, the instrumented object 100. Generally the position sensor 126 detects the position of the instrumented object 100 according to techniques used by those skilled in the art of location determination. The position sensor 126 generates position measurements indicative of the determined location within the enclosed space. The communication interface 122 is used to communicate the collected atmospheric measurements and position measurements.

The propulsion system 130 includes a recharge/refuel port 132 connected to an energy storage 134. The energy storage 134 can be configured as a battery for storing electrical energy or as a fuel tank for storing combustible fuel. In a configuration where the energy storage 134 is a battery, the recharge/refuel port 132 can be a pair of electrical terminals for recharging the battery. In a configuration where the energy storage is a fuel tank, the recharge/refuel port 132 can be a port for receiving combustible fuel, such as liquid combustible fuel. In the instrumented object 100 provided in FIG. 1A the energy storage is used to drive a navigation drive 138 and a lift drive 136. The navigation drive 138 is used to rotate a navigation propeller 112, and the lift drive 136 is used to rotate a lift propeller 110. In a configuration, the navigation drive 138 and the lift drive 136 can each be an engine or a motor configured to rotate a drive shaft by drawing energy from the energy storage 134. An instrumented object 100 having the propulsion system 130 can be considered a self-propelled object, because the instrumented object 100 is configured to use the propulsion system 130 to move through the enclosed space using energy from the energy storage. According to an aspect of the present disclosure, the instrumented object 100 configured as a self-propelled object has the ability to move through the enclosed space. While the navigation drive 138 is illustrated as driving a navigation propeller 112, the navigation drive 138 can also drive louvers or flaps that raise or lower in order to adjust air foils on the instrumented object 100 and adjust the steering of the instrumented object while it is in flight. In an example with the instrumented object 100 configured as a helicopter, the lift propeller 110 can be used to generate lift for the helicopter and the navigation propeller 112 can be used to steer the helicopter. It is to be understood that other embodiments of the instrumented object 100 will not require all of the elements set fort in FIG. 1A.

Figure 1B:
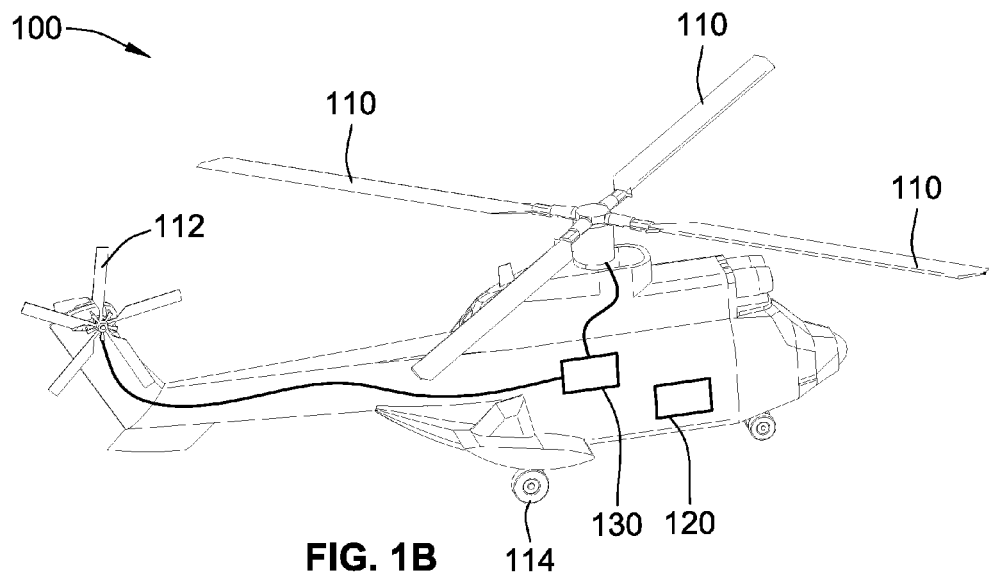
FIG. 1B provides an instrumented object configured as a helicopter.
Figure 1C:
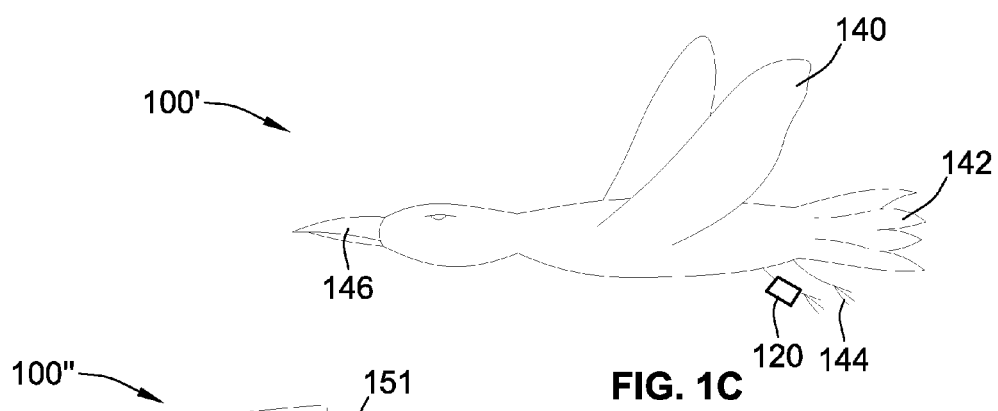
FIG. 1C provides an instrumented object configured as a hummingbird.
Figure 1D:
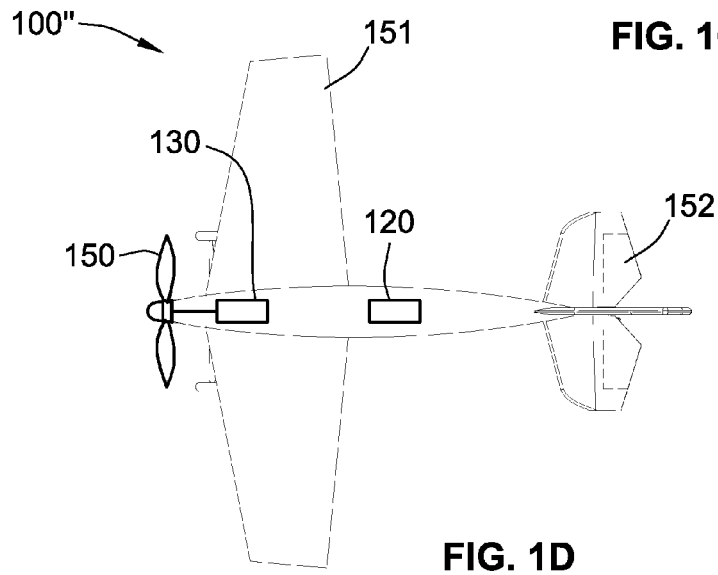
FIG. 1D provides an instrumented object configured as a fixed wing aircraft.
Figure 2A:
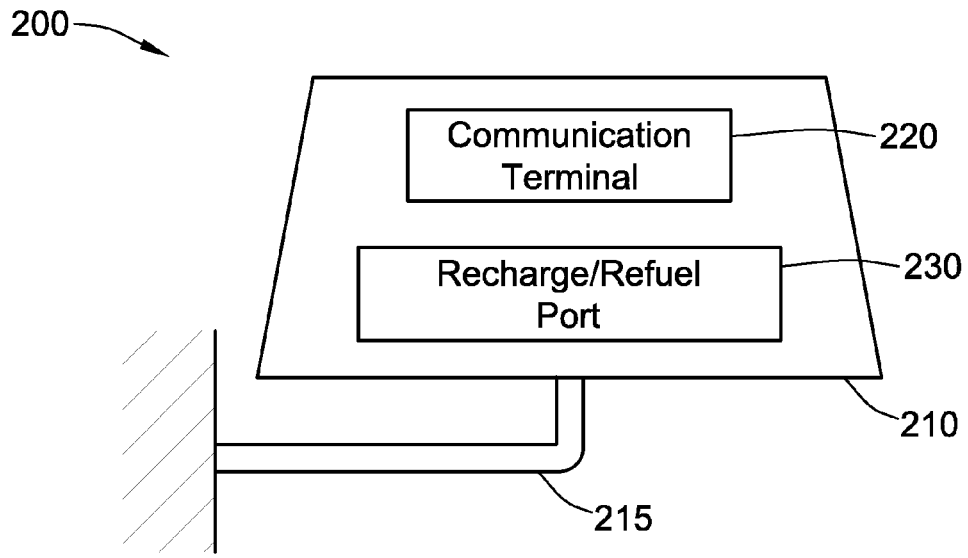
FIG. 2A provides a base station configured as a helipad.
Figure 2B:
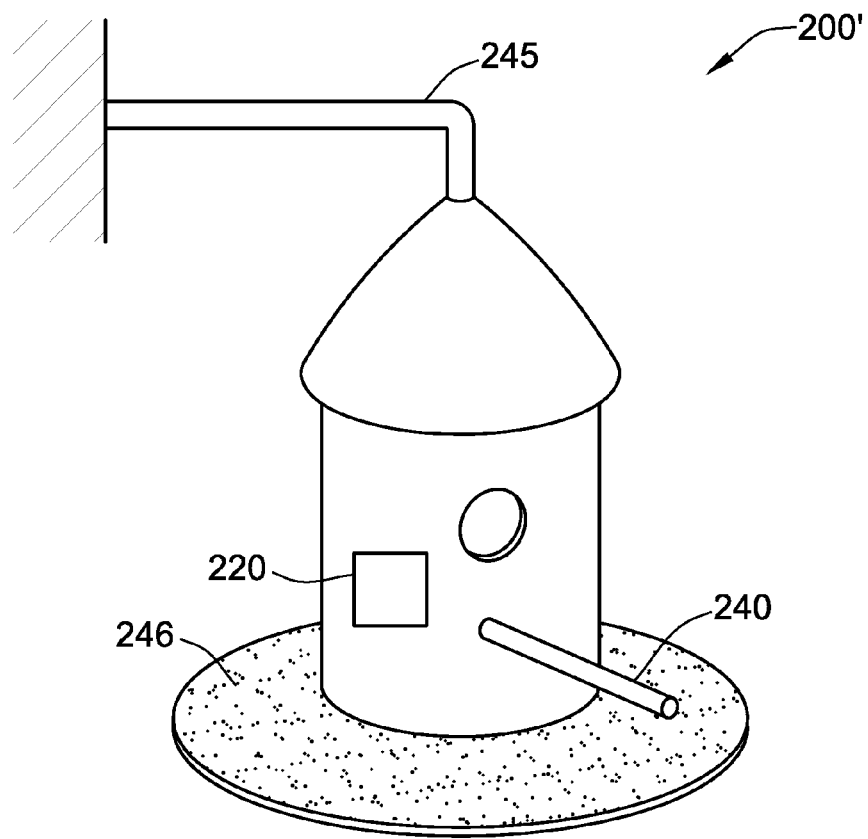
FIG. 2B provides a base station configured as a bird feeder.

FIGS. 1B through 1D illustrate example implementations of instrumented objects (100, 100', 100") useful in implementing the system and method for gathering atmospheric measurements in an enclosed space for use by a building management system. FIGS. 2A and 2B illustrate base stations (200, 200') that can optionally be used cooperatively with the instrumented objects (100, 100', 100") in an implementation of the system and method disclosed herein.

FIG. 1B provides an instrumented object 100 configured as a helicopter. The instrumented object 100 includes a propeller 110 for generating lift, a directional control propeller 112, a landing support 114, and a propulsion system 130. The propulsion system 130 is connected to the lift propeller 110 and the navigation propeller 112. The navigational propeller 112 provides directional control for the instrumented object 100 while in flight. The instrumented object 100 further includes a measurement device 120. The measurement device 120 has an atmospheric sensor 124 and a communication terminal 122. The measurement device 120 can optionally include a position sensor 126. The instrumented object 100 configured as a helicopter is a self-propelled object because it includes the propulsion system 130. The instrumented object 100 can be a helicopter commonly commercially available as a toy or hobbyist product.

In a configuration of the instrumented object 100, the measurement device 120 can be contained within a case and attached to the external portion of a commercially available helicopter, or the instrumented object 100 can be a purpose-made helicopter and the measurement device 120 can be integrated into the body of the helicopter. The communication terminal 122 can be a wireless communication terminal for sending signals indicative of collected atmospheric measurements and position measurements according to any standard wireless communication protocol including: zigbee, bluetooth, and IEEE 802.11. The communication terminal 122 can also be a terminal that sends measurements collected in the measurement device 120 through a data line.

In a configuration, the instrumented object 100 can operate autonomously without real time intervention from a user. For example, the instrumented object 100 can navigate according to navigation commands contained in wireless signals transmitted to the instrumented object 100. Navigation commands can be generated by a user operating the instrumented object using a wireless controller. For example, in a configuration of the instrumented object 100 configured as a radio controlled helicopter, the instrumented object 100 can be controlled to move through a flight path according to commands transmitted from a remote controller The commands and remote controller can be implemented according to techniques appreciated by those skilled in the art of commanding and controlling remote controlled aircraft. Additionally, the navigation commands can be generated by a centralized computer system configured to command and control the navigation and measurement activity of the instrumented object 100. The centralized computer system can be configured to, for example, direct the instrumented object 100 to travel through a region in the enclosed space in order to acquire atmospheric measurements in the region. Furthermore, the centralized computer system can be configured to ensure that the instrumented object 100 avoids collisions with other flying objects.

FIG. 1C provides an instrumented object 100' configured as a hummingbird. The instrumented object 100' includes wings 140 for generating lift, tail feathers 142 for providing directional control, feet 144 for landing support, and a beak 146 for refueling the bird with bird food. The instrumented object 100' is equipped with the measurement device 120. The measurement device 120 can be attached to the feet 144. As described above, the measurement device 120 includes sensors for collecting atmospheric measurements and position measurements. The measurement device 120 includes the communication terminal 122 for communicating the atmospheric measurements and position measurements. While the instrumented object 100' is configured as a hummingbird, the present disclosure extends to systems using birds capable of carrying the measurement device 120 and capable of flying through an enclosed space while carrying the measurement device 120.

The instrumented object 100' configured as a hummingbird is a self-propelled object because the hummingbird is configured to intake bird seed or nectar, which is digested and converted into an energy storage of stored caloric energy within the hummingbird. The instrumented object 100' configured as a hummingbird then moves through the enclosed space using energy stored in the energy storage by using muscles to flap the wings 140. In an implementation, the hummingbird can be considered functionally equivalent to the propulsion system 130.

FIG. 1D provides an instrumented object 100" configured as a fixed wing aircraft. The instrumented object 100" includes a propeller 150 for providing a forward thrust, a fixed wing 151 for generating lift, and a rear louvered tail 152 for providing directional control. The instrumented object 100" further includes the propulsion system 130 symbolically illustrated proximate the propeller 150. The instrumented object 100" further includes the measurement device 120 for collecting and communicating atmospheric measurements. The instrumented object 100" can be an aircraft of a type commercially available and marketed as a toy or hobbyist product.

Other types of flying devices, such as lighter-than-air devices (i.e. balloons or dirigibles), ornithopters, hover craft, etc., can be used in place of the instrumented objects (100, 100', 100") according to aspects of the present disclosure. In a configuration, the instrumented objects utilized according to aspects of the present disclosure can be heavier than air, or lighter than air. A lighter-than-air device can be a device which has a mass less than the mass of air displaced by the lighter-than-air device.

FIG. 2A provides a base station 200 configured as a helipad. The base station 200 includes a landing surface 210, a recharge/refuel port 230 and a communication terminal 220. The base 200 is mounted to an interior wall of an enclosed space and supported by a support arm 215. The base 200 provides a location for the instrumented object 100 to land while it is not flying through the enclosed space. In operation, the instrumented object 100 lands on the landing surface 210 of the base 200 after the instrumented object 100 moves through a flight path. The communication terminal 220 can be a data port for making a physical connection with a data carrying line, or can be an antenna for sending and receiving wireless signals.

In a configuration where the measurement device 120 includes a communication terminal 122 for sending wireless signals indicative of collected atmospheric measurements and position measurements, the communication terminal 220 is an antenna. The communication terminal 220 can optionally be further enabled to send signals to the instrumented object 100. Signals sent to the instrumented object 100 can be signals for controlling the navigation of the instrumented object 100. For example, in an implementation where the instrumented object 100 is a commercially available radio controlled helicopter, the communication terminal 220 can be used to send wireless signals to the instrumented object 100 to adjust the navigation of the helicopter according to techniques available for performing command and control operations of a radio controlled helicopter using wireless signals. Alternatively, the base station 200 can be implemented without the communication terminal 220. The communication terminal 220 can be located in the enclosed space away from the base station 200 so long as the range between the communication terminal 220 and the instrumented object 100 does not exceed a useful range of the chosen communication medium. In a configuration employing wireless communication, locating the communication terminal 220 on the base station 200 can advantageously allow for the use of low-power signals that are broadcast only at short ranges. Using low-power signals can advantageously preserve battery life, reduce energy consumption, and provide less interference with other electronic devices utilizing wireless signals. Using low-power signals can also advantageously reduce the weight requirement of the measurement device 120 attached to the instrumented object 100.

While the instrumented object 100 is on the base station 200, the instrumented object 100 can refuel or recharge using the recharge/refuel port 230. In a configuration of the instrumented object using an electric motor to rotate the propeller 110, the recharge/refuel port 230 can be a pair of electric terminals for recharging a battery located in the instrumented object 100. The pair of electric terminals can be located on the landing surface 210 so as to contact the landing support 114 when the instrumented object 100 lands on the base station 200. The landing support 114 can incorporate the recharge/refuel port 132. The recharge/refuel port 132 can be implemented as recharging terminals connected to the downward facing portion of the landing support 114 for recharging the energy storage 134. In a configuration of the instrumented object 100 using a combustion engine to rotate the propeller 110, the recharge/refuel port 230 can be a nozzle for dispensing combustible fuel. The recharge/refuel port 230 can optionally be a nozzle for dispensing fuel that automatically connects to the recharge/refuel port 132.

The base station 200 shown in FIG. 2A can be modified to provide a landing region for the instrumented object 100″. To accommodate the instrumented object 100″ configured as a fixed wing aircraft, the base station 200 includes a larger or longer 210 appropriate for landing a fixed wing aircraft. The base station 200 shown in FIG. 2A is useful for providing the instrumented object 100 a place to land, recharge, and optionally send and receive measurements or data. However, with a modified landing surface 210 appropriate for landing a fixed wing aircraft on, the base station 200 provides a place for the instrumented object 100″ to land, recharge, and optionally send and receive measurements or data.

FIG. 2B provides a base station 200' configured as a bird feeder. The base station 200' includes a communication terminal 220, a feeder tray 246, and a landing rail 240. The base station 200' provides a location for the instrumented object 100' to land while it is not moving through an enclosed space collecting atmospheric parameter measurements. The base station 200' is mounted to an interior wall of the enclosed space and supported by a support arm 245. The feeder tray 246 can be filled with bird feed, sugar water, or nectar. An instrumented object 100' configured as a hummingbird can land on the landing rail 240 after flying through a flight path within the enclosed space. While resting on the landing rail 240, the instrumented object 100' can use the beak 146 to refuel by eating bird seeds or nectar from the feeder tray 246. At the same time, the measurement device 120 carried on the instrumented object 100' can transmit measurements to the communication terminal 220. For example, the measurement device 120 can transmit the atmospheric measurements and position measurements to the communication terminal 220 using a wireless signal. Alternatively, the base station 200' can be implemented without the communication terminal 220, and the communication terminal 220 can be located elsewhere subject to the limitations of the selected communications medium.

Figure 3:
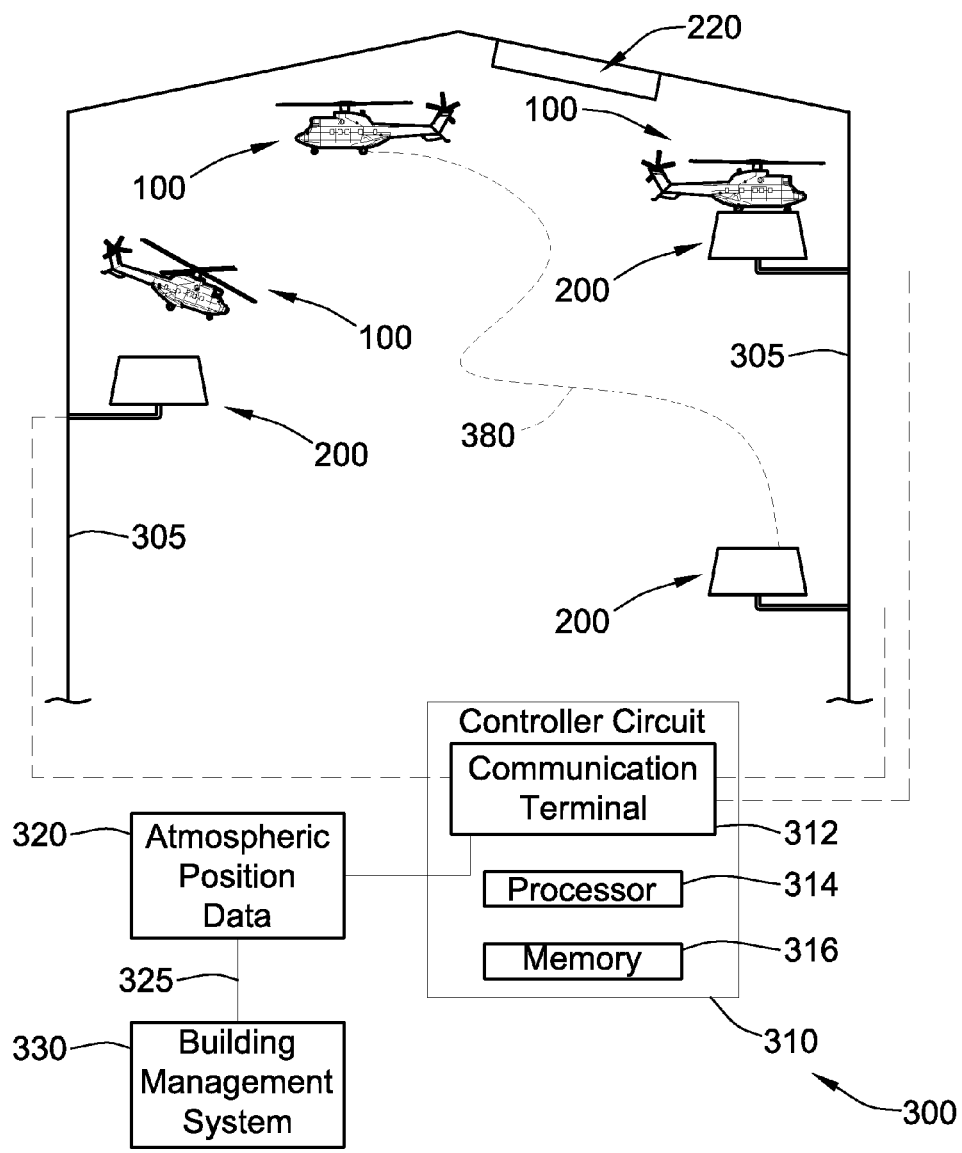
FIG. 3 is a diagram of an atmospheric measurement collection system.

FIG. 3 is a diagram of an atmospheric measurement collection system 300. The atmospheric measurement collection system 300 includes the instrumented object 100, which measures an atmospheric parameter in the interior of an enclosed space and sends the measurements to a controller circuit 310. The enclosed space is bounded by interior walls 305 and a ceiling. One or more base stations 200 are mounted on the interior walls 305. The base stations 200 provide a location for the instrumented object 100 to land, recharge, and optionally send and receive measurements of data.

The controller circuit 310 can include a communication terminal 312, a processor 314, and a memory 316. Within the controller circuit 310, the processor 314 is electronically coupled to both the memory 316 and one of the communication terminal 312 or communication terminal 220 in the base station 200. When provided in the controller circuit 310, the communication terminal 312 is connected to the base station 200 for sending and receiving measurements or data. The communication terminal 312 receives a collected set of atmospheric measurements and position measurements from the base station 200, which receives measurements from the instrumented object 100. The processor 314 is programmed to associate the location of the instrumented object 100 with the detected atmospheric parameter. The detected atmospheric parameter and the associated position measurement become the atmospheric position data 320, because together they provide information about a particular atmospheric parameter at a particular location within the enclosed space at a particular time. The atmospheric position data 320 is sent to a building management system (BMS) 330 through a data link 325. The data link 325 can be a wireless data connection or a connection using a physical wire configured for sending and receiving data. The BMS 330 uses the atmospheric position data 320 to adjust mechanical controls within the building in order to create or maintain a desired atmospheric condition within the enclosed space. For example, the BMS 330 can be a system regulating louvers, blowers, or fans within a ventilation system providing ventilation to the enclosed space. The BMS 330 can adjust the louvers, blowers, or fans to regulate the temperature with the enclosed space. Additionally, based on the atmospheric position data 320, the BMS 330 can locally regulate atmospheric conditions within the enclosed space.

According to a configuration of the present disclosure, the BMS 330 can be used to regulate carbon dioxide concentration by bringing in fresh air when carbon dioxide content exceeds a threshold, or when a rate of change of carbon dioxide content exceeds a threshold. The BMS 330 can also be used to locally control the temperature within the enclosed space. The BMS 330 can also be used to control the humidity within the enclosed space. The BMS 330 can optionally adjust shades or blinds on windows in a portion of a building to control the solar heating within the enclosed space. The BMS 330 can turn on or off lights within the building in an automated fashion according to a time of day, or according to measurements from, for example, motion sensors. The BMS 330 can also adjust other electrical controls within the building, such as, for example, a thermostat control. The BMS 330 can adjust a rate of drawing in fresh air in order to effect air turn over within the building or can halt or commence an air turnover operation. In operation, the BMS 330 can create or maintain the described atmospheric conditions while also optimizing energy consumption of the ventilation system of the building. In an implementation, the atmospheric measurement collection system 300 provides a feedback to the BMS 330 for the BMS 330 to determine when to start and stop taking actions to manage the mechanical controls of the building.

To collect data with the system 300, the instrumented object 100 flies through the enclosed space along a flight path. For example, the instrumented object 100 can fly along a flight path 380. The flight path 380 can be a predetermined path that the instrumented object 100 is configured to fly. Alternatively, the flight path 380 can be a path that is determined according to commands contained in a wireless signal transmitted to the instrumented object 100. According to an aspect of the present disclosure, the flight path 380 can be a random path, a predetermined path, or a controlled path that is determined in part according to commands. Accordingly, the instrumented object 100 can be configured to move through the enclosed space in a random, predetermined, or controlled manner.

In operation of the system 300, the instrumented object 100 collects a set of atmospheric measurements with the measurement device 120 carried on the instrumented object 100. Following the completion of the flight path 380, the instrumented object 100 returns to the base station 200 and lands. While the instrumented object 100 is docked with the base station 200, the measurement device 120 uses the communication interface 122 to transmit the set of atmospheric measurements to the communication terminal 220 on the base station 200. The measurement device 120 also transmits position measurements collected by the position sensor 126 during the flight of the instrumented object 100 along the flight path 380. The base station 200 then communicates the set of atmospheric measurements and the position measurements to the controller circuit 310. The controller circuit 310 receives the set of atmospheric measurements and position measurements from the communication terminal 312 and then uses the processor 314 to associate the set of measured atmospheric parameters with a set of measurement locations based on the set of position measurements. The atmospheric position data 320 is then transmitted to the BMS 330, which is configured to adjust a mechanical control of the building based on the atmospheric position data 320.

In some applications, a plurality of instrumented objects 100 and base stations 200 can be used within an enclosed space. The atmospheric measurement collection system 300 shown in FIG. 3 incorporates three instrumented objects 100 and three base stations 200. The three instrumented objects 100 can each be associated with one of the three base stations 200, and can each dock with the same base station 200 following each flight. Alternatively, the instrumented objects 100 can alternately land on each of the base stations 200.

In an alternative implementation, the system 300 is configured with the communication terminal 220 not located on the base station 200. The communication terminal 220 can be located within the enclosed space at a position where it can easily gather the atmospheric parameter measurements and position measurements from the instrumented object 100 and pass data indicative of the measurements to the communication link 312 within the controller circuit 310.

Figure 4:
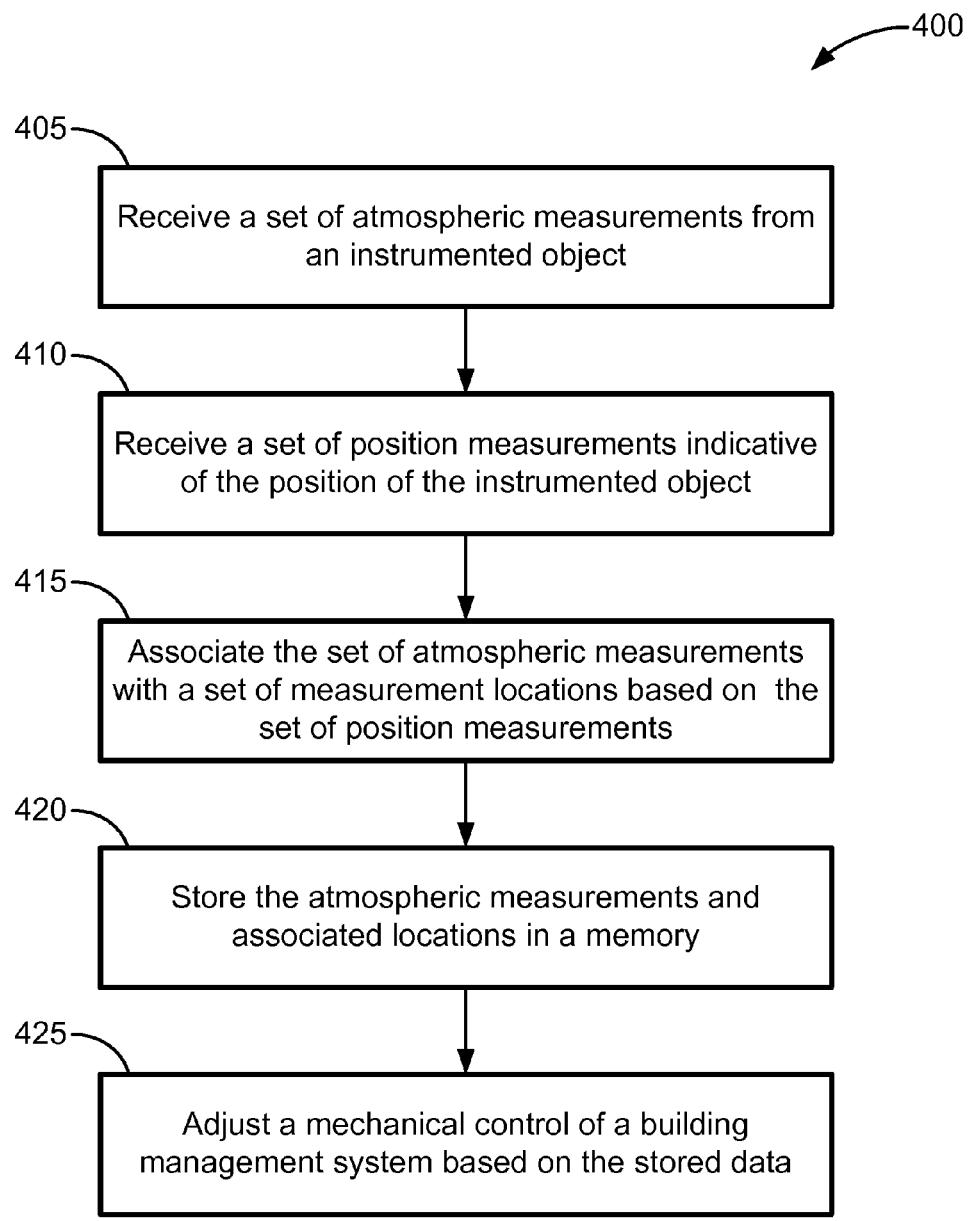
FIG. 4 is a flowchart showing a method of collecting atmospheric measurements using atmospheric sensors mounted on instrumented objects moving through an enclosed space, and using the collected atmospheric measurements to adjust a mechanical control of a building management system.

FIG. 4 is a flowchart 400 showing a method of collecting atmospheric measurements using atmospheric sensors mounted on instrumented objects moving through an enclosed space, and using the collected atmospheric measurements to adjust a mechanical control of a building management system. According to an aspect of the present disclosure, the method shown in the flowchart 400 is a method of obtaining measurements for use by a building management system (BMS). According to the method shown in the flowchart 400, a set of atmospheric measurements is received from an instrumented object moving through an enclosed space (405). A set of position measurements indicative of the position of the instrumented object is also received (410). A processor is configured to associate the set of atmospheric measurements with a set of measurement locations based on the set of position measurements (415). For example, the set of measurement locations can be determined by using time stamps associated with the set of atmospheric measurements and the set of position measurements to determine the location of the instrumented object at the time of each measurement in the set of atmospheric measurements. The atmospheric measurements and associated locations are then stored in a memory (420). The atmospheric measurements and associated locations are communicated to a building management system. The building management system is configured to adjust a mechanical control based on the atmospheric measurements and associated locations (425). The atmospheric position data provides the building management system with localized information about atmospheric parameters within the enclosed space enabling the building management system to locally compensate for or correct atmospheric conditions within the enclosed space.

Figure 5:
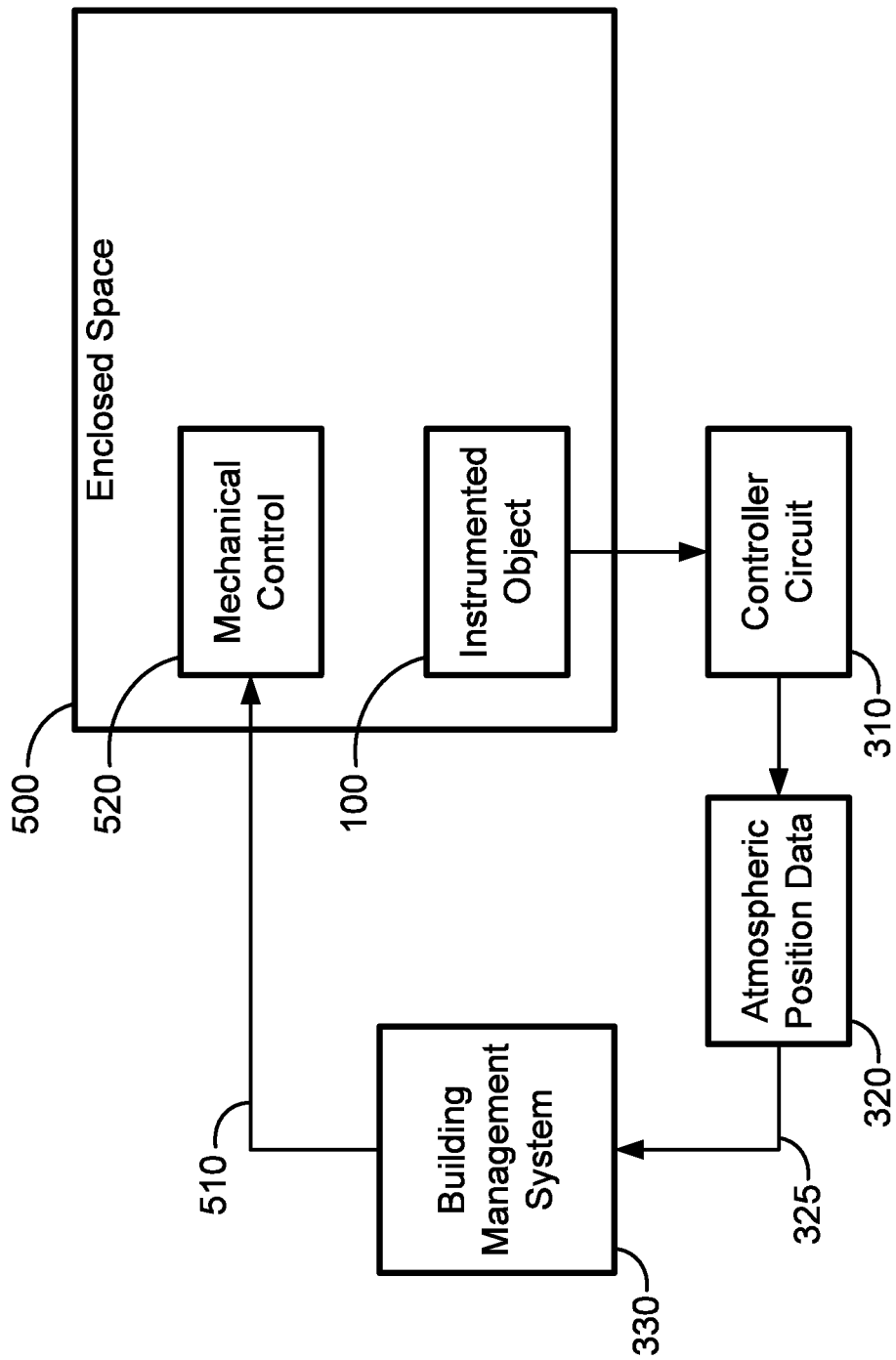
FIG. 5 is a block diagram illustrating a building management system using atmospheric position data from an instrumented object to control environment within an enclosed space.

FIG. 5 is a block diagram illustrating a building management system (BMS) 330 operating by receiving feedback from atmospheric position data 320 gathered by an instrumented object 100 within an enclosed space 500. The BMS 330 is configured to operate a mechanical control 520 by sending a control signal 510 to the mechanical control 520. The mechanical control 520 is a control that affects an atmospheric parameter within the enclosed space 500. For example, the mechanical control 520 can be a fan, blower, or louver of a heating, ventilation, and air conditioning (HVAC) system. The mechanical control 520 can also optionally be a mechanical feature of a building that blocks the passage of light into the enclosed space 500, such as a window blind or curtain. The mechanical control 520 can also change a temperature setting of a furnace or an air conditioner within an HVAC system that ventilates the enclosed space 500.

In operation, the BMS 330 receives atmospheric position data 320 through the data link 325 from the controller circuit 310. Based on the atmospheric position data 320, the BMS 330 determines an adjustment to the mechanical control 520. In determining the adjustment to the mechanical control 520, the BMS 330 can compare the atmospheric position data 320 to a desirable atmospheric condition. The BMS 330 can continue to adjust the mechanical control 520 based on a comparison between the atmospheric position data 320 and the desirable atmospheric condition until the atmospheric position data 320 indicates that the desirable atmospheric condition exists within the enclosed space 500. According to an implementation of the present disclosure, the atmospheric position data 320 transmitted to the building management system 330 through the data link 325 provides feedback to the building management system 330 for operating a mechanical control 520.

For example, in a configuration where the BMS 330 is operating to regulate the humidity within the enclosed space 500 by maintaining the humidity at a desirable humidity level, the BMS 330 can compare measured humidity levels contained in the atmospheric position data 320 to the desirable humidity level. If the measured humidity levels exceed the desirable humidity level, the mechanical control effecting humidity can be adjusted to decrease the humidity level within the enclosed space. Similarly, if the measured humidity levels are below the desirable humidity level, the mechanical control effecting humidity can be adjusted to increase the humidity level within the enclosed space. Alternatively, the BMS 330 can operate by adjusting the mechanical control 520 when the atmospheric position data 320 reveals that an atmospheric parameter within the enclosed space has exceeded or fallen below a threshold value.

Furthermore, the BMS 330 utilizing the atmospheric position data 320 can adjust the mechanical control 520 based on atmospheric non-uniformities within the space. For example, in a configuration where the mechanical control 520 is a set of fans, blower, or louvers of an HVAC system ventilating the enclosed space 500, the BMS 330 can issue a control signal 510 to the mechanical control 520 to redirect airflow toward or away from a region of the enclosed space 500. The BMS 330 can correct a local buildup of carbon dioxide in the enclosed space, which can be caused by, for example, a large concentration of people clustered in one region of the enclosed space 500. The BMS 330 can correct the local buildup of carbon dioxide (or any other detected gas) by, for example, operating an air intake of the HVAC system to effect a turn over of the air within the enclosed space 500 with fresh air. The BMS 330 can activate blowers, fans, louvers, or temperature controls of a furnace or air cooling element to heat local cool spots within the enclosed space 500, or to cool local hot spots within the enclosed space 500.

Additionally, in an enclosed space 500 with large volumes of air that are unpopulated, such as a large atrium with a significant volume of air overhead any occupants, the BMS 330 can operate to direct airflow in a manner that minimizes energy expenditure to heat and cool unpopulated regions of the enclosed space 500. The BMS 330 can also utilize real time three dimensional models of atmospheric parameters within the enclosed space 500 based on the atmospheric position data 320 dynamically sent to the BMS 330. The three dimensional model can be used to predict a change in atmospheric conditions within the enclosed space 500 responsive to an adjustment of the mechanical control 520. The three dimensional model can incorporate iterative numerical techniques as appreciated by those skilled in the art of fluid dynamics. The three dimensional model can be revised and improved over time based on the atmospheric position data 320 gathered by the instrumented object 100 that can provide dynamic feedback to the BMS 330.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A system for providing a measurement of an atmospheric parameter in an enclosed space to a building management system controlling atmospheric conditions within the enclosed space, the system comprising:
   a plurality of instrumented objects, each of which includes a measurement device, an atmospheric sensor for detecting the measurement of the atmospheric parameter, a communication interface for transmitting the measurement of the atmospheric parameter, and a propulsion system for moving the instrumented object at varying heights in a volume of the enclosed space, wherein each of the instrumented objects operates autonomously without real time intervention from a user;
   a controller circuit including:
      a communication terminal for receiving a set of position measurements and a plurality of measurements of an atmospheric parameter from each of a corresponding communication interface of the plurality of measurement devices,
      a processor electronically connected to the communication terminal, the processor being programmed to determine a plurality of locations based on the received position measurements and to associate respective ones of the determined locations with the corresponding received measurement of the atmospheric parameter, wherein the plurality of locations include different and varying heights within a volume of the enclosed space, and
      a memory for storing the received measurements of the atmospheric parameter and the associated locations, the memory electronically connected to the processor;
   a data link between the controller circuit and the building management system configured for sending the received measurements of the atmospheric parameter and the associated locations to the building management system, the building management system configured to adjust a control of a building according to a function including the received measurements of the atmospheric parameter and the associated locations; and
   a position sensor for tracking the locations of the instrumented objects within the volume of the enclosed space and creating the set of position measurements indicative of the tracked locations.

2. The system of claim 1, wherein each of the instrumented objects is self-propelled by the propulsion system having an energy storage and is configured to move through the enclosed space using energy stored in the energy storage.

3. The system of claim 2, further comprising:
   a base station having a recharging or refueling port for dispensing fuel or energy to at least one of the instrumented objects.

4. The system of claim 2, wherein at least one of the instrumented objects moves by rotating a propeller to create lift.

5. The system of claim 2, wherein at least one of the instrumented objects is a fixed-wing aircraft.

6. The system of claim 1, wherein each of the instrumented objects operates autonomously without real time intervention from a user.

7. The system of claim 1, wherein the atmospheric parameter is one or more of temperature, oxygen content, carbon dioxide content, humidity, smoke, or airflow rate in the enclosed space.

8. The system of claim 1, wherein at least some of the set of position measurements are based on a reading from an accelerometer attached to at least one of the instrumented objects.

9. The system of claim 1, wherein the set of position measurements are based on a measured relative time delay of signals received by each of the instrumented objects or of signals transmitted or reflected from each of the instrumented objects.

10. The system of claim 1, wherein at least one of the instrumented objects is heavier than air or lighter than air and has an ability to move through the enclosed space in a random, predetermined, or controlled manner.

11. A method of obtaining measurements of an atmospheric parameter in an enclosed space, the method comprising:
   receiving a set of measurements of the atmospheric parameter from each of a plurality of instrumented objects, each having an ability to move at different and varying heights using a propulsion system through a volume of the enclosed space, each of the instrumented objects including an atmospheric sensor configured to measure the atmospheric parameter, wherein each of the instrumented objects operates autonomously without real time intervention from a user;
   receiving, from a position sensor, a set of position measurements indicative of a plurality of locations of the instrumented objects within the enclosed space, wherein the plurality of locations include different and varying heights within the volume;
   associating, using a processor of a control circuit, the set of measurements of the atmospheric parameter with a set of measurement locations based on the set of position measurements;
   storing, in a memory of the control circuit, the set of measurements of the atmospheric parameter and the set of measurement locations; and
   sending the set of measurements of the atmospheric parameter and the associated set of measurement locations to a building management system to cause the building management system to adjust a ventilation system connected to the enclosed space based on the set of measurements of the atmospheric parameter and the associated set of measurement locations.

12. The method of claim 11, wherein at least one of the instrumented objects is a self-propelled object that includes an energy storage and wherein the at least one of the instrumented objects is configured to move through the enclosed space using energy stored in the energy storage.

13. The method of claim 11, wherein at least one of the instrumented objects operates autonomously without real time intervention from a user.

14. The method of claim 11, wherein the atmospheric parameter is one or more of temperature, oxygen content, carbon dioxide content, humidity, smoke, or airflow rate in the enclosed space.

15. The method of claim 11, wherein the building management system is configured to adjust a blower, a fan, a louver, or a fresh air intake of the ventilation system connected to the enclosed space.

16. A non-transitory computer readable medium encoded with instructions for directing a controller to perform the method of claim 11.

17. A method of operating a building management system, the building management system configured to adjust a control of a building, the method comprising:

receiving a set of atmospheric data from a plurality of self-propelled objects, the set of atmospheric data indicative of one or more atmospheric parameters at different and varying heights within a volume of enclosed space and detected using a measurement device in each of the self-propelled objects moving at different and varying heights within the enclosed space having atmospheric conditions maintained by the building management system, the measurement device in each of the self-propelled objects including:

an atmospheric sensor for detecting the one or more atmospheric parameters; and a communication interface for communicating the detected one or more atmospheric parameters as atmospheric data;

wherein each of the instrumented objects operates autonomously without real time intervention from a user;

receiving a set of position measurements indicative of the locations of each of the self-propelled objects within the enclosed space, the locations including different and varying heights within the volume;

analyzing the received set of atmospheric data and the received set of position measurements to determine an atmospheric characteristic of the enclosed space; and adjusting the control of the building according to a function including the determined atmospheric characteristic.

18. The method of claim 17, wherein the mechanical control is a vent, a fan, or a louver influencing the direction or speed of air ventilating the enclosed space.

19. The method of claim 17, wherein the analyzing is carried out by modeling a three-dimensional temperature distribution or gas content of the enclosed space based on the received set of atmospheric data and the received set of position measurements, and wherein the adjusting is carried out by determining an adjustment to the mechanical control based on a predicted change in atmospheric conditions within the enclosed space responsive to the adjustment according to the three-dimensional model.

20. The method of claim 17, wherein the control of the building is a mechanical control and is adjusted to redirect airflow in a manner that minimizes an energy expenditure to heat or cool an unpopulated region of the enclosed space.

21. The method of claim 17, wherein the control of the building includes adjustable aspects of an HVAC system, and wherein the adjusting is carried out by adjusting an aspect of the HVAC system to correct a local atmospheric non-uniformity within the enclosed space.

22. The method of claim 21, wherein the local atmospheric non-uniformity is a local buildup of carbon dioxide, a local hot spot, or a local cool spot within the enclosed space.

* * * * *